(12) United States Patent
Gorroño et al.

(10) Patent No.: US 12,217,030 B2
(45) Date of Patent: Feb. 4, 2025

(54) GENERATING AUTOMATIONS VIA NATURAL LANGUAGE PROCESSING

(71) Applicant: Microsoft Technology Licensing, LLC, Redmond, WA (US)

(72) Inventors: José Luis Fernández Gorroño, Paris (FR); Lan Li, Bellevue, WA (US); Cédric Thierry Michel Bignon, Clamart (FR); Nicolas Chao Wei Ding, Issy-les-Moulineaux (FR); Cédric Bernard Jean Golmard, Plaisir (FR); Anand Mourouguessin, Bezons (FR); Jaime Enrique Reyes Salazar, Bellevue, WA (US); Shuktika Jain, Bellevue, WA (US); Dimitrios Leventis, Attica (GR); Yu Hu, Sammamish, WA (US); Haoran Wei, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 161 days.

(21) Appl. No.: 17/847,972

(22) Filed: Jun. 23, 2022

(65) Prior Publication Data

US 2023/0333827 A1    Oct. 19, 2023

Related U.S. Application Data

(60) Provisional application No. 63/331,375, filed on Apr. 15, 2022.

(51) Int. Cl.
*G06F 8/41* (2018.01)
*G06F 8/10* (2018.01)
*G06F 8/38* (2018.01)

(52) U.S. Cl.
CPC .............. *G06F 8/42* (2013.01); *G06F 8/10* (2013.01); *G06F 8/38* (2013.01)

(58) Field of Classification Search
CPC ............... G06F 8/38; G06F 8/10; G06F 8/42
See application file for complete search history.

(56) References Cited

U.S. PATENT DOCUMENTS

| 9,875,235 B1 | 1/2018 | Das et al. |
| 10,521,462 B2 | 12/2019 | Acampado |

(Continued)

FOREIGN PATENT DOCUMENTS

| AU | 2019232804 B2 | 12/2020 |
| IN | 111898369 A | 11/2020 |

OTHER PUBLICATIONS

Devarakonda, et al., "Social Media Based NPL System to Find and Retrieve ARM Data: Concept Paper", In Proceedings of the IEEE International Conference on Big Data, Dec. 11, 2017, pp. 4736-4737.

(Continued)

*Primary Examiner* — Phillip H Nguyen
(74) *Attorney, Agent, or Firm* — Weaver IP L.L.C.

(57) ABSTRACT

Methods for generating automations via natural language processing are performed by computing systems. Natural language input is received from a user interface, and an automation workflow is generated based on the natural language input. The automation workflow includes steps to build an automation. One or more of the steps is provided to the user interface, and a first field and a second field that each correspond to the one or more steps are populated in the user interface. The first field is populated with a parameter value based on the natural language input, and the second field is populated based on the parameter value. The automation is then enabled to be built and deployed.

20 Claims, 11 Drawing Sheets

(56) References Cited

U.S. PATENT DOCUMENTS

| | | |
|---|---|---|
| 11,077,367 B1 | 8/2021 | Thacker et al. |
| 11,258,732 B2 | 2/2022 | Nahum et al. |
| 11,789,754 B2 * | 10/2023 | Grigore .................. G06F 9/451 717/171 |
| 2018/0349256 A1 * | 12/2018 | Fong ..................... G06F 40/284 |
| 2020/0089524 A1 | 3/2020 | Nelson et al. |
| 2020/0192975 A1 * | 6/2020 | Maes ...................... H04L 67/10 |
| 2022/0084284 A1 | 3/2022 | Thacker et al. |

OTHER PUBLICATIONS

Habib, Mohammad Kasra, "On the Automated Entity-Relationship and Schema Design by Natural Language Processing", In International Journal of Engineering and Science, vol. 8, Issue 11, Dec. 7, 2019, pp. 42-48.

Jackson, et al., "From Natural Language to Simulations: Applying GPT-3 Codex to Automate Simulation Modeling of Logistics Systems", In Repository of arXiv:2202.12107v1, Feb. 24, 2022, 28 Pages.

* cited by examiner

GENERATING AUTOMATIONS VIA NATURAL LANGUAGE PROCESSING

CROSS REFERENCE TO RELATED APPLICATIONS

This application claims priority to U.S. Provisional Application No. 63/331,375, filed on Apr. 15, 2022, entitled "GENERATING AUTOMATIONS VIA NATURAL LANGUAGE PROCESSING," which is incorporated by reference herein in its entirety.

BACKGROUND

Existing solutions for low-code, no-automation solutions require users to build, step by step, the different actions they want their automations to do, and to codify the logic in the expression language of the corresponding automation platform. Such solutions thus require a significant learning curve for new users to get to a point where they can build automation flows.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for generating automations via natural language processing are performed by computing systems. Natural language input is received from a user interface, and an automation workflow is generated based on the natural language input. The automation workflow includes steps to build an automation. One or more of the steps is provided to the user interface, and a first field and a second field that each correspond to the one or more steps are populated in the user interface. The first field is populated with a parameter value based on the natural language input, and the second field is populated based on the parameter value. The automation is then enabled to be built and deployed.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based at least on the teachings contained herein.

BRIEF DESCRIPTION OF THE DRAWINGS/FIGURES

The accompanying drawings, which are incorporated herein and form a part of the specification, illustrate aspects of the present application and, together with the description, further serve to explain the principles of the aspects and to enable a person skilled in the pertinent art(s) to make and use the aspects.

Figure 8A:
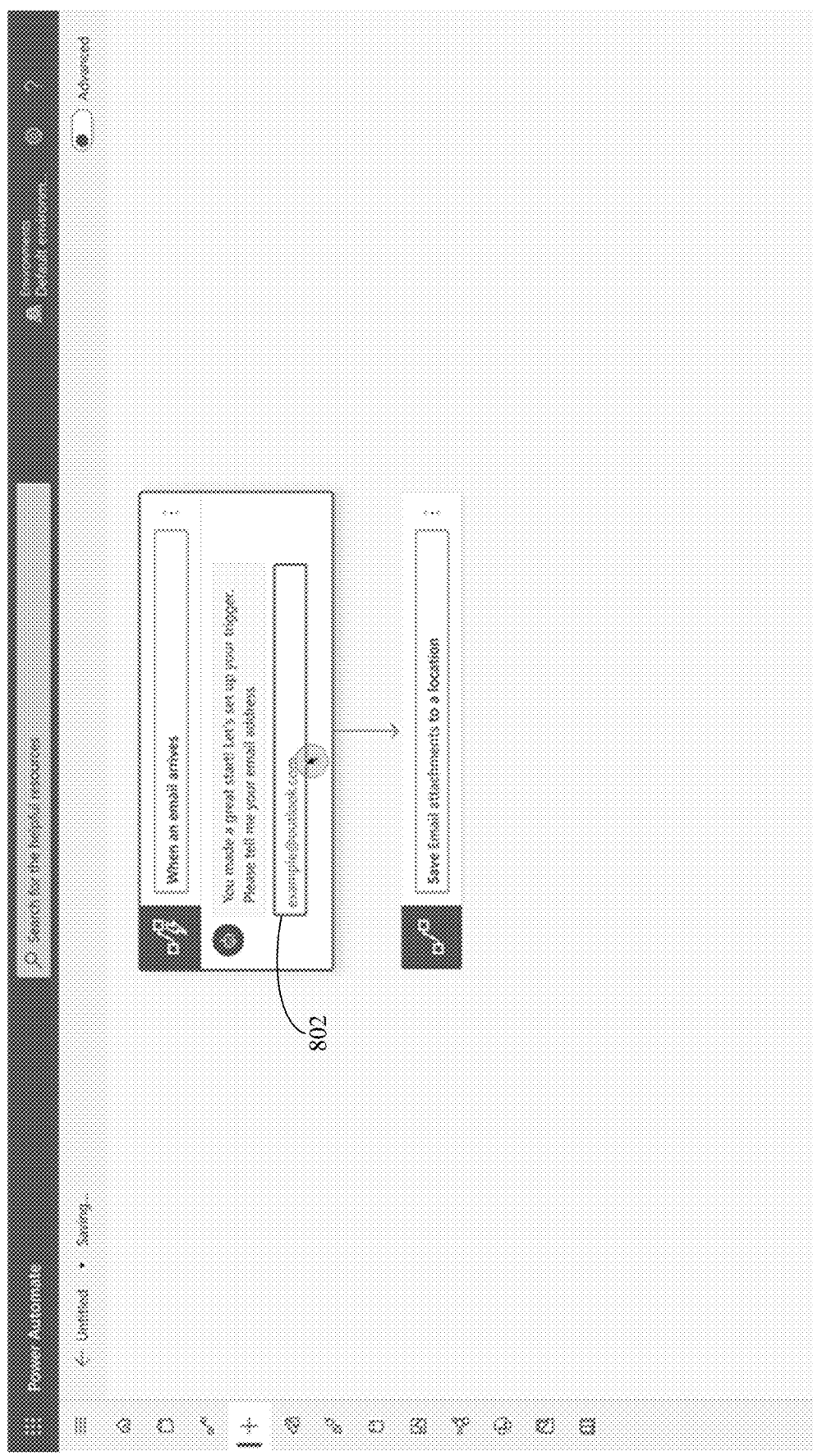
Figure 8B:
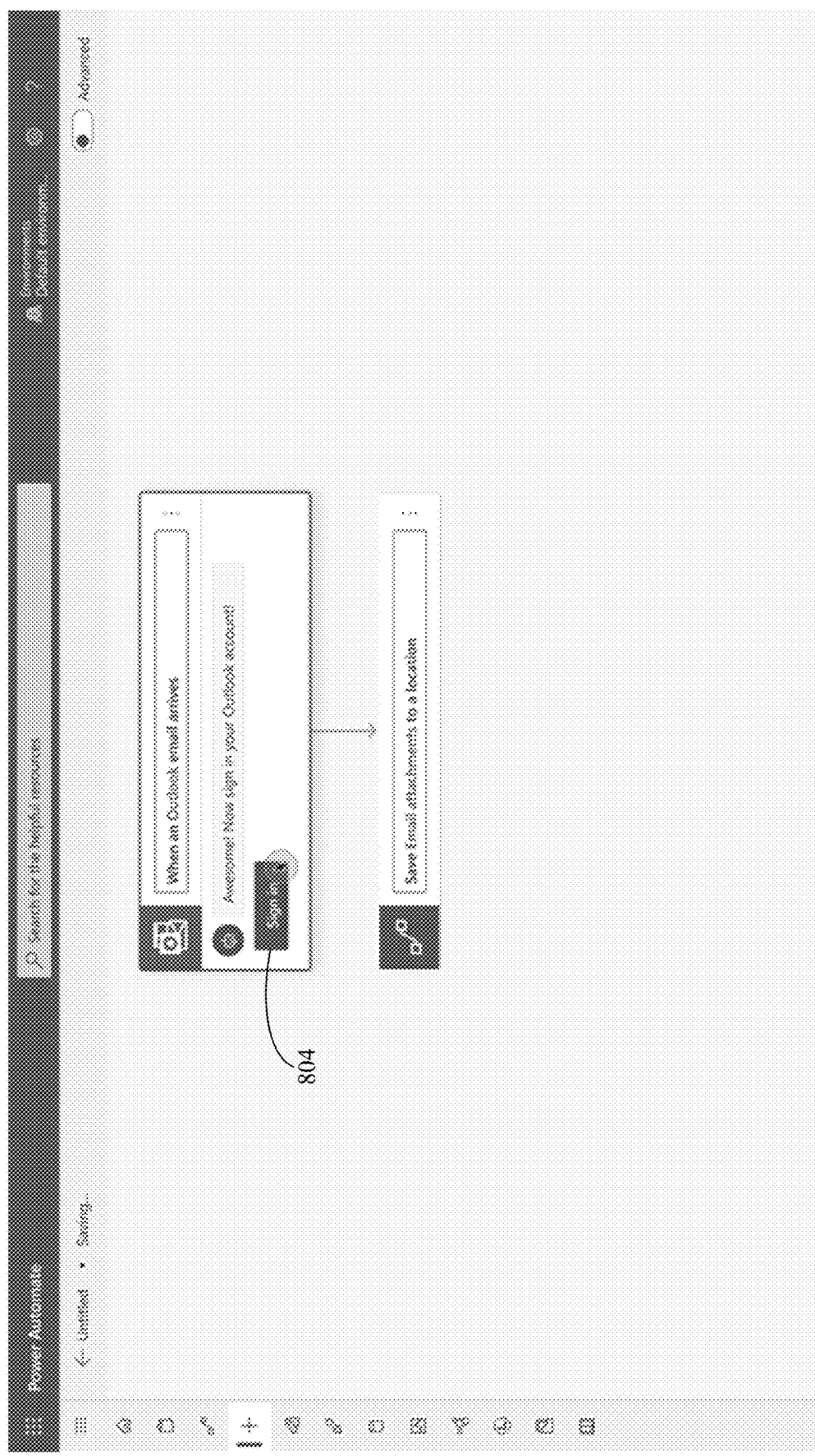

FIGS. 8A and 8B each show diagrams of user interfaces for generating automations via natural language processing, in accordance with an example aspect.

Figure 9:
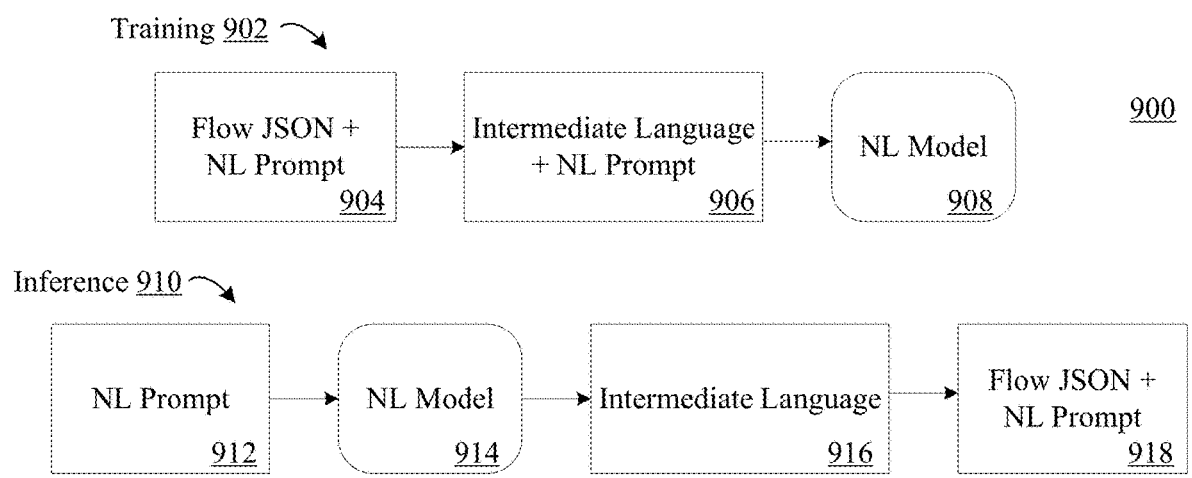

FIG. 9 shows a flow diagram for generating automations via natural language processing, in accordance with an example aspect.

Figure 10:
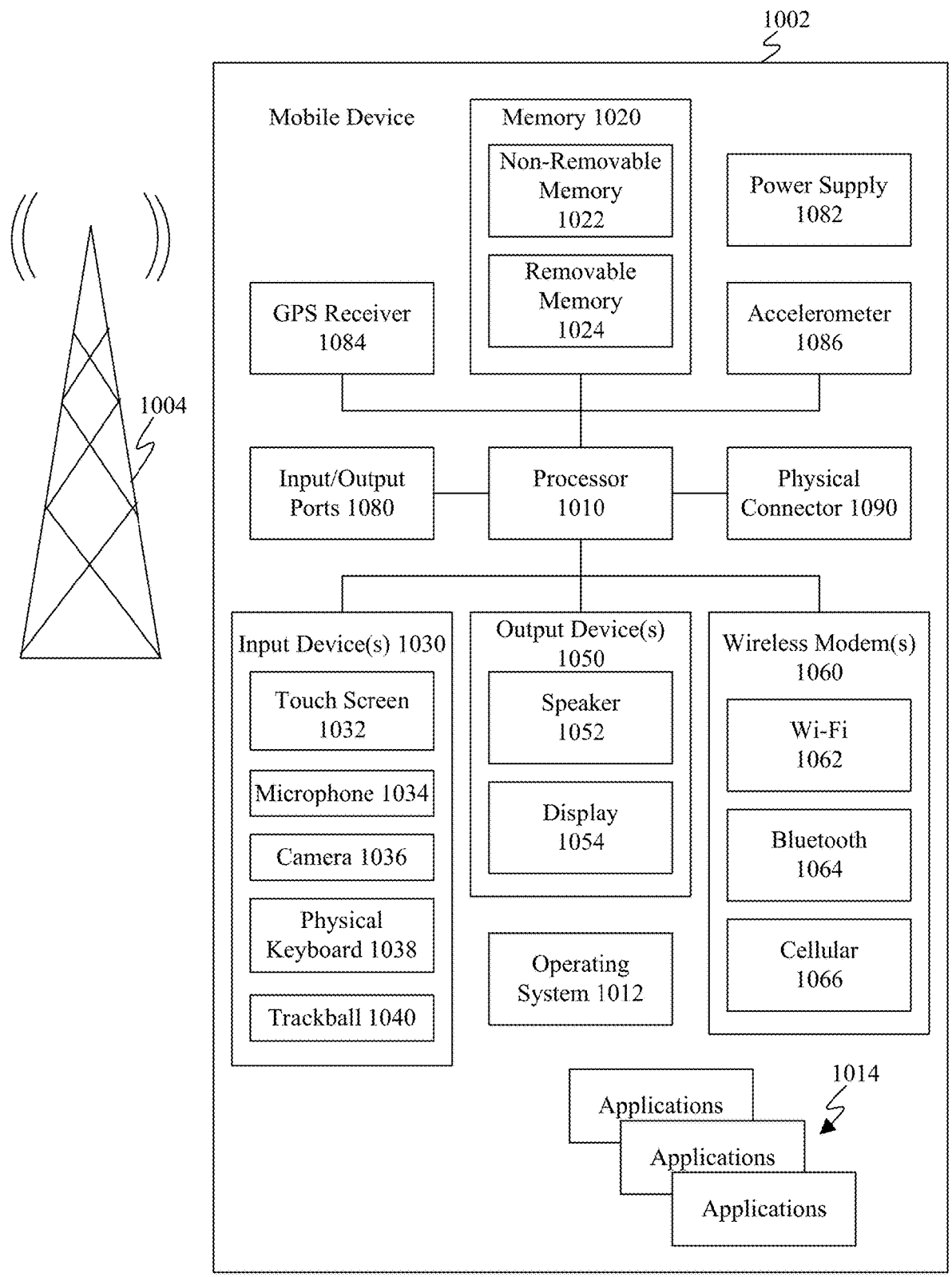

FIG. 10 shows a block diagram of an example mobile computing device that may be used to implement aspects herein.

Figure 11:
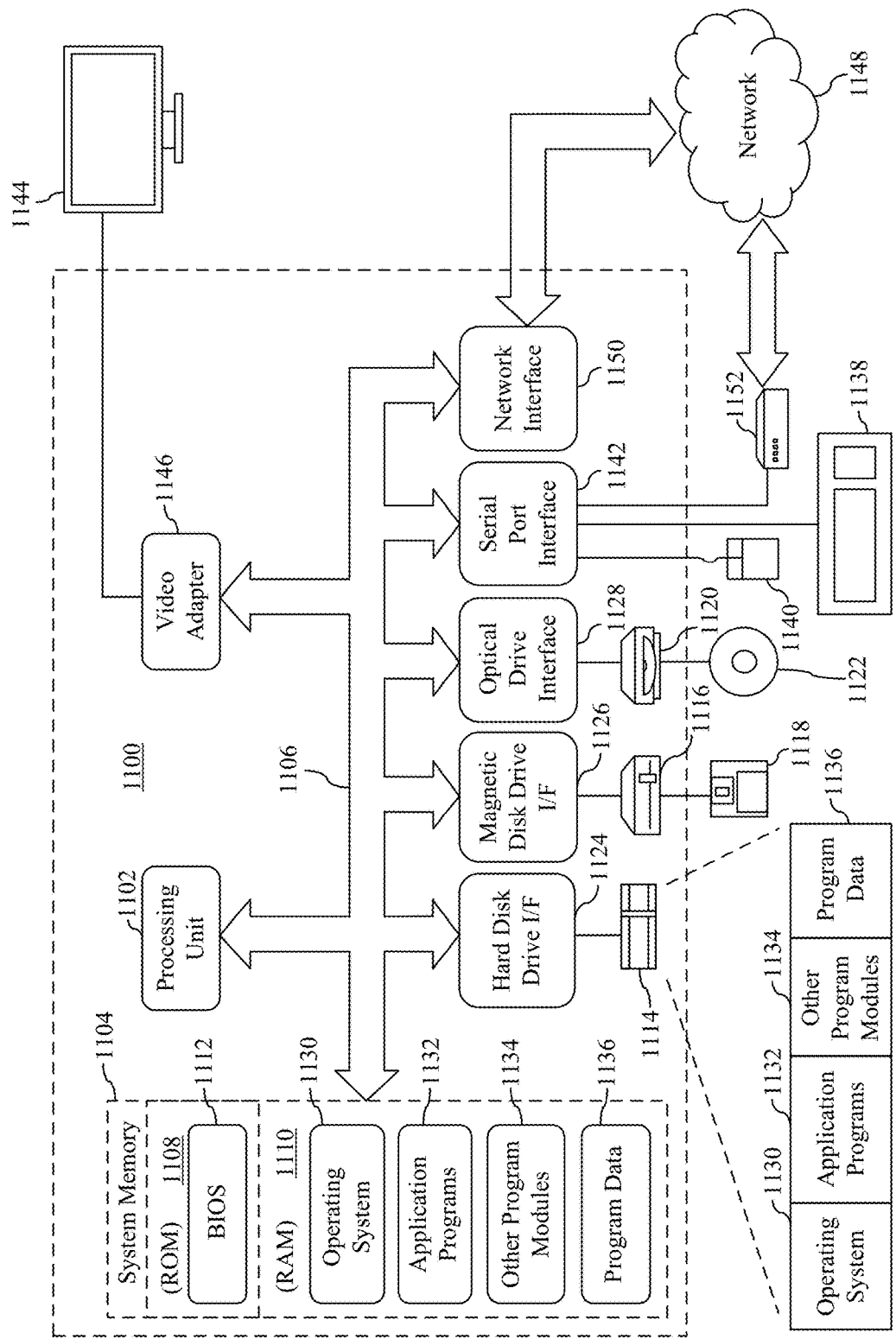

FIG. 11 shows a block diagram of an example computing device that may be used to implement aspects herein.

The features and advantages of aspects will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous aspects. The scope of the present patent application is not limited to the disclosed aspects, but also encompasses combinations of the disclosed aspects, as well as various modifications to the disclosed aspects.

References in the specification to "one aspect," "an aspect," "an example aspect," "one embodiment," "an embodiment," "an example embodiment," and/or the like, indicate that the aspect/embodiment described may include a particular feature, structure, or characteristic, but every aspect/embodiment may not necessarily include the particular feature, structure, or characteristic. Moreover, such phrases are not necessarily referring to the same aspect/embodiment. Further, when a particular feature, structure, or characteristic is described in connection with an aspect/embodiment, it is submitted that it is within the knowledge of one skilled in the relevant art(s) to affect such feature, structure, or characteristic in connection with other aspects/embodiments whether or not explicitly described.

In the discussion, unless otherwise stated, adjectives such as "substantially," "approximately," and "about" modifying a condition or relationship characteristic of a feature or features of an aspect of the disclosure, are understood to mean that the condition or characteristic is defined to be within tolerances that are acceptable for operation of the aspect for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in aspects.

Numerous exemplary aspects are described as follows. It is noted that any section/subsection headings provided herein are not intended to be limiting. Aspects are described throughout this document, and any type of aspect may be included under any section/subsection. Furthermore, aspects disclosed in any section/subsection may be combined with any other aspects described in the same section/subsection and/or a different section/subsection in any manner.

Section II below describes example aspects for generating automations via natural language processing. Section III below describes example computing devices that may be used to implement features of the aspects described herein. Section IV below describes additional examples and advantages, and finally, Section V provides some concluding remarks.

II. Example Aspects for Generating Automations Via Natural Language Processing Methods for generating automations via natural language processing are performed by computing systems as described herein for various aspects. For example, a system receives natural language input from a user interface, and generates a workflow based at least on the natural language input, where the workflow includes one or more steps to build an automation (where the automation may be considered a workflow, or "flow" herein for distinction, during its own operation). The system provides at least one step of the one or more steps to the user interface, and populates a first field and a second field in the user interface that each correspond to the at least one step, where the first field is populated with a parameter based at least on the natural language input, and the second field is populated based at least on the parameter, thereby improving the user interface and its ease of use for the user. The system then builds the automation and/or deploys the automation for use.

Existing solutions require a significant learning curve for new users to get to a point where they can build automation flows. Accordingly, such users may inadvertently introduce programming errors, improper parameters, bugs, etc., into the automations and/or application, which can affect the computing device or system on which such automations and/or applications execute. For example, such issues may cause the device or system to incur an unnecessary expenditure of compute resource(s) (e.g., processing cycles, memory, storage, power, etc.), may require additional expenditure for time spent programming, or even cause a device or system to crash. The techniques described herein prevent such disastrous scenarios, as the generation of automations via natural language processing by systems herein automatically learns and/or generates the automations on behalf of the user from natural language inputs, and thus avoids errors, delays, and other inefficiencies with which the learning curve for new users is rife.

Aspects herein provide a low-code automation platform that enables users who do not have development skills to build automation processes. These automations may be referred to as flows and are based on a workflow of steps from which the automations are generated/created. That is, a low-code automation building experience where users can describe in plain language what they want to automate and have a flow automation created is provided herein. Users are enabled to speak or type in natural language what they want to automate, and aspects described herein generate for them the automation flow that performs it. In some aspects, by way of example and not limitation, a GPT-3 model that has been fined-tuned is configured to take the natural language input description provided by the user, and output an automation flow.

Described aspects are applicable to any type of server/host implementation, including but not limited to cloud-based platforms. Aspects may be incorporated into, or be a part of, software applications/services for generating automations, flows, bots, etc., such as Microsoft® Power Automate™ from Microsoft Corporation of Redmond, WA. Additionally, aspects are described herein by way of example and for purposes of illustration, however, other implementations and architectures are also adaptable to, and contemplated for, the described aspects and are contemplated herein.

These and other aspects will be described in further detail below, in association with the Figures, and in Sections/Subsections that follow.

Figure 1:
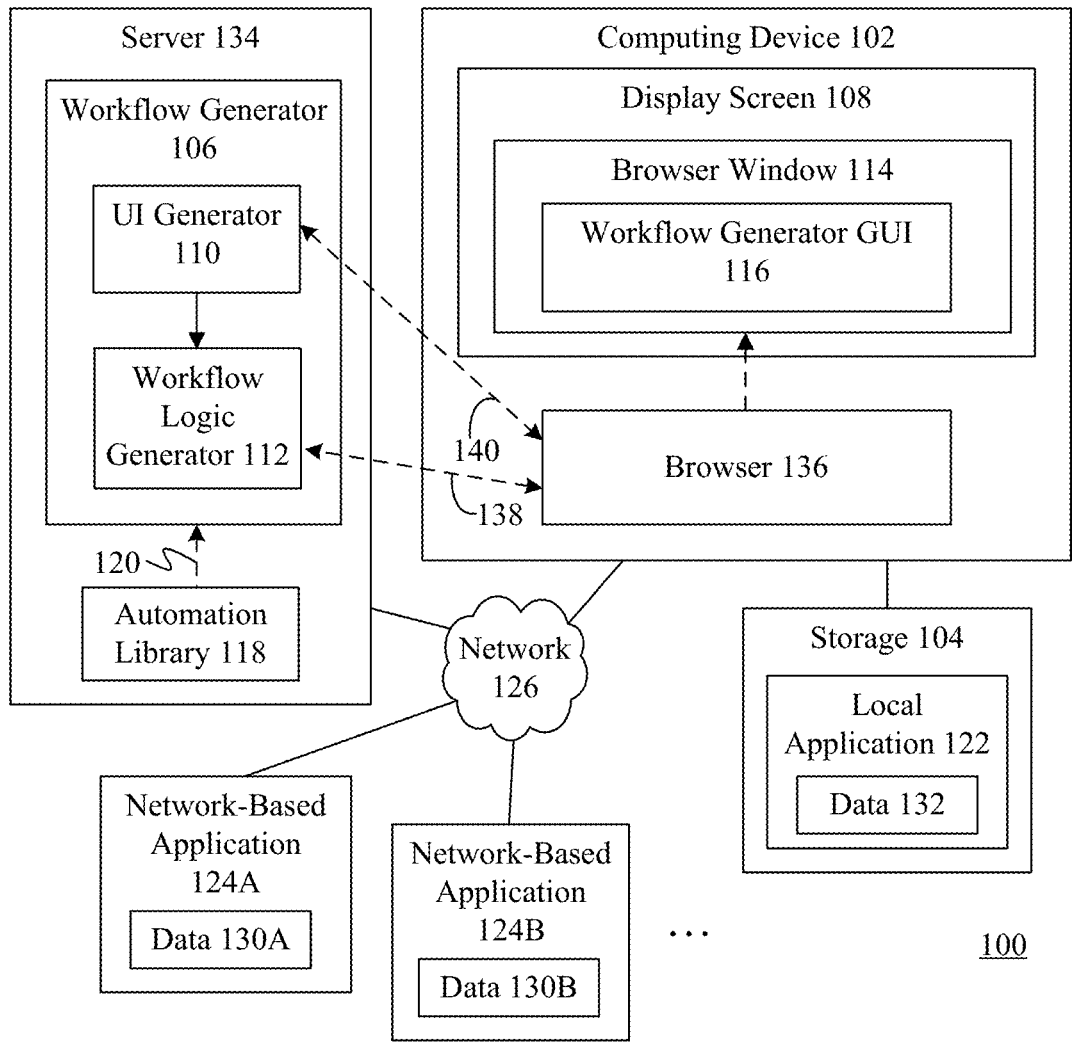
FIG. 1 shows a block diagram of a system for generating automations via natural language processing, according to an example aspect.

Systems, devices, and apparatuses herein may be configured in various ways for generating automations via natural language processing. For instance, FIG. 1 will now be described. FIG. 1 is a block diagram of a workflow development system 100 (also "system 100"), according to an example aspect. As shown in FIG. 1, system 100 includes a computing device 102, storage 104, a first network-based application 124A, a second network-based application 124B, and a server 134. Server 134 includes a workflow generator 106 and an automation library 118 that stores steps for automations, flows, bots, etc. (e.g., in a storage). Workflow generator 106 includes an UI generator 110 and a workflow logic generator 112. Computing device 102 includes a display screen 108 and a browser 136. Storage 104 stores a local application 122. System 100 is described as follows.

Computing device 102 may be any type of stationary or mobile computing device, including a mobile computer or mobile computing, a wearable computing device, or a stationary computing device such as a desktop computer or PC (personal computer). Server 134 may include one or more server devices and/or other computing devices.

Local application 122 in storage 104 is an example of an application accessible by computing device 102 without communicating over a network. Local application 122 may be configured to perform data processing and/or data hosting operations when executed by a processor of computing device 102, and may provide data 132 to flows/automations created by workflow generator 106 during runtime of those flows/automations. Local application 122 may be any type of local application/service, such as but not limited to, a database application (e.g., QuickBooks®, a Microsoft® Excel® spreadsheet), a messaging application (e.g., Microsoft® Outlook®), a productivity application (e.g., Microsoft® Word®, Microsoft® PowerPoint®, etc.), or another type of application/service. Although FIG. 1 shows a single local application, any number of local applications may be present at computing device 102, including numbers in the tens, hundreds, or even greater numbers of local applications.

First and second network-based applications 124A and 124B are examples of network-based applications, also referred to as "cloud" applications or services. Network-based applications 124A and 124B are accessible by computing device 102 over network 126, may be configured to perform data processing and/or data hosting operations, and may provide data 130A and 130B, respectively, to flows/automations created by workflow generator 106 during runtime thereof. Network-based applications 124A and 124B may each be any type of web accessible applications/services, such as database applications, collaborative document management and storage system applications, social networking applications, messaging applications, financial services applications, news applications, search applications, web-accessible productivity applications, cloud storage and/file hosting applications, etc. Examples of such applications/services include, without limitation, a web-accessible SQL (structured query language) database, Salesforce.com™, Facebook®, Twitter®, Instagram®, Yammer®, LinkedIn®, Yahoo!® Finance, The New York Times® (at www.nytimes.com), Google search, Microsoft® Bing, Google Docs™, Microsoft® Office 365 and/or services/applications thereof, Dropbox™, Microsoft SharePoint™, etc. Although FIG. 1 shows two network-based applications/services, any number of network-based applications/services may be accessible over network 126, including numbers in the tens, hundreds, thousands, or even greater numbers of network-based applications/services. For simplicity and brevity, "applications" hereinafter also includes "services," as would be understood by persons of skill in the relevant art(s) having the benefit of this disclosure.

Note that data 128, data 130A, data 130B, and data 132 may each include any type of data, including messages, notifications, calculated data, retrieved data, files, attachments, and/or any other type of information requested or usable by a flow or automation.

Computing device 102 and server 134 may each include at least one network interface that enables communications with each other and with network-based applications 124A and 124B over network 126. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein. Examples of network 126 include a local area network (LAN), a wide area network (WAN), a personal area network (PAN), and/or a combination of communication networks, such as the Internet.

Workflow generator 106 is configured to be operated/interacted with to create automations/flows by generating workflows thereof comprising steps as described herein. For instance, a developer may access workflow generator 106 by interacting with an application at computing device 102 capable of accessing a network-based application, such as browser 136. The developer may use browser 136 to traverse a network address (e.g., a uniform resource locator) to workflow generator 106, which invokes a workflow generator GUI 116 (e.g., as a web page) in a browser window 114.

The developer is enabled to interact via natural language with workflow generator GUI 116 to generate an automation workflow from which an automation, flow, bot, etc., is created. An example of workflow generator 106 includes, but is not limited to, Microsoft® Power Automate™. In some aspects, workflow generator 106 is configured to perform one or more of receive natural language input from a user interface, generate an automation workflow based at least on the natural language input, the automation workflow including one or more steps to build an automation, provide at least one step of the one or more steps to the user interface, populate a first field and a second field in the user interface that each correspond to the at least one step, the first field being populated with a parameter based at least on the natural language input, and the second field being populated based at least on the parameter, and build the automation and/or deploy the automation.

As shown in FIG. 1, workflow generator 106 includes UI generator 110 and workflow logic generator 112. UI generator 110 is configured to transmit workflow GUI information 140 (A) (e.g., one or more web pages, image content, etc.) to browser 136 to be displayed as workflow generator GUI 116 in display screen 108 in browser window 114. Workflow generator GUI 116 may be interacted with by the developer via natural language inputs (voice, text, etc.) to proactively/automatically generate automation workflows, comprising steps, into a flow, automation, etc., as illustrated in the FIGS. described below. It should also be noted that a GUI herein may also be described as a UI, generally, and that both graphical and non-graphical UIs are contemplated for aspects herein as would be understood by persons of skill in the relevant art(s) having the benefit of this disclosure.

For example, a user maybe presented with one or more automation workflow steps, in workflow generator GUI 116, associated with a local or network-based application. In one example scenario, consider that a user enters natural language input of "I want to store email attachments to OneDrive" in workflow generator GUI 116. One result of this input is that workflow generator GUI 116 displays the one or more steps to generation the automation for storing the user's email attachments to OneDrive® (see exemplary description of FIGS. below).

Browser 136 is configured to provide natural language inputs 140 (B) from workflow generator GUI 116 to UI generator 110 at server 134, which workflow generator 106 utilizes to generate an automation(s). As part of this process, a user may be provided automation steps 120 for the determined automation that are stored in automation library 118 via workflow generator GUI 116. Such steps may include parameters 138 (A) and/or configuration values that are automatically determined and populated by workflow generator 106 as well as parameters and/or configuration values that the user may provide via workflow generator GUI 116.

Browser 136 stores the automation workflow steps and parameters/parameter values, corresponding configuration information, and/or workflow step sequence information, etc., as constructed workflow information 138 (B). Constructed workflow information 138 (B) is transmitted to workflow logic generator 112 at server 134. Workflow logic generator 112 generates an automation based at least on the assembled workflow steps and workflow information 138 (B). The flow represented by the automation may subsequently be invoked or deployed at runtime by an end user, or may be automatically invoked based on a condition of the flow/automation being met subsequent to deployment (e.g., a new email with an attachment is received).

During runtime of the automation/flow, the automation may invoke operation of one or more local or network-based applications associated with the automation/flow steps 120 of the automation. Each flow step 120 may receive input data from or transmit output data to the one or more local or network-based applications. Such input or output data may include, for example, input data 132 received from or sent to local application 122, data 130A received from or sent to network-based application 124, data 130B received from or sent to network-based application 124B, etc.

Workflow generator 106 may operate and/or be configured in various ways, to enable development of a flow or an automation herein. For instance, in aspects, workflow generator 106 may be configured as in system 200 of FIG. 2 and/or operate in accordance with flowchart 300 of FIG. 3.

Figure 2:
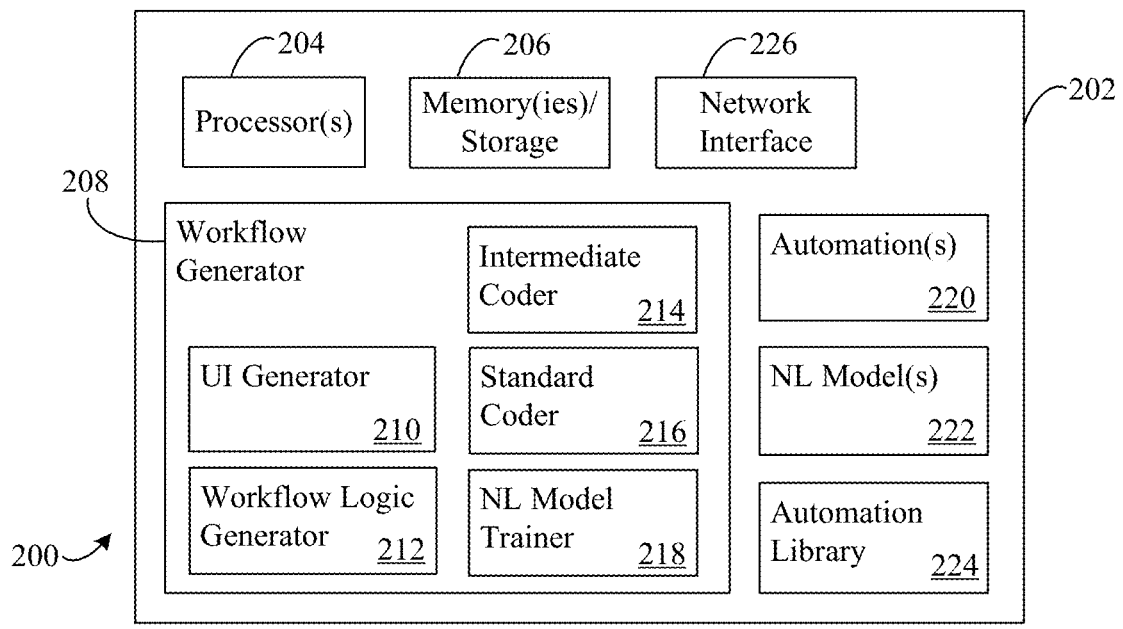
FIG. 2 shows a block diagram of a computing system for generating automations via natural language processing, according to an example aspect.

Referring now to FIG. 2, a block diagram of a system 200 is shown for generating automations via natural language processing, according to an example aspect. System 200 is configured to be an aspect of system 100 of FIG. 1, e.g., server 134 and workflow generator 106. Like- or similarly-named components of system 100 illustrated in system 200 may be aspects thereof. System 200 is described as follows.

System 200 includes a computing system 202, which is an aspect of server 134 of FIG. 1, in aspects, and which is any type of server or computing system, as mentioned elsewhere herein, or as otherwise known, including one or more cloud-based servers that support multi-tenancies. As shown in FIG. 2, computing system 202 includes one or more processors ("processor") 204, one or more of a memory and/or other physical storage device ("memory") 206, as well as one or more network interfaces ("network interface") 226. Computing system 202 includes one or more automation libraries ("automation library") 224 which may be an aspect of automation library 118 of FIG. 1, and a workflow generator 208 that is an aspect of workflow generator 106 of FIG. 1. Workflow generator 208 is configured to perform aspects of generating automations via natural language processing, as described herein, including but without limitation, those described above for workflow generator 106 of FIG. 1, and/or the like. In aspects, while not shown for brevity and illustrative clarity, workflow generator 208 comprises a portion of a server or web application/service. Computing system 202 also includes one or more automations ("automation(s)") 220 that are generated by workflow generator 208 based on natural language inputs, and one or more natural language (NL) model(s) 222 that are used in the generation of one or more automations 220, as described herein. In aspects, automation(s) 220, NL model(s) 222, and/or automation library 224 may be stored in memory 206.

System 200 also includes additional components (not shown for brevity and illustrative clarity) including, but not limited to, components and subcomponents of other devices and/or systems herein, as well as those described below with respect to FIGS. 19-20, such as an operating system, according to aspects.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 may be multi-core processors configured to execute more than one processing thread concurrently, and cores of processor 204 may be grouped with portions of memory 206 as processing resources allocated for hosting services and/or for generating automations via natural language processing. Processor 204 may comprise circuitry that is configured to execute computer program instructions such as, but not limited to, aspects of workflow generator 208, which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, workflow manager 208, including one or more of the components thereof as described herein, as well as automation(s) 220, NL model(s) 222, and/or automation library(ies) 224, etc.

Network interface 226 may be any type or number of wired and/or wireless network adapter, modem, etc., configured to enable system 200, including computing system 202, to communicate with other devices and/or systems over a network, including cloud networks, such as communications between computing system 202 and other devices, systems, hosts, of system 100 in FIG. 1 over a network such as network 126 of which network interface 226 may connect.

In some aspects, UI generator 210 is an aspect of UI generator 106 of FIG. 1 and is configured to perform similar or like operations/functions. Similarly, in some aspects, workflow logic generator 212 is an aspect of workflow logic generator 112 of FIG. 1 and is configured to perform similar or like operations/functions.

NL model trainer 218 is configured to train NL model(s) 222, which may be performed in conjunction with an intermediate coder 214 that is configured to provide a coding language, e.g., an intermediate language, with logical expressions that are absent from the standard workflow definitional language utilized by a standard coder 216. In some aspects, steps for automation stored in automation library 224 are, in whole or in part, in the standard workflow definitional language utilized by a standard coder 216. Intermediate coder 214 and standard coder 216 are each configured to convert between these languages for training of NL model(s) 222 (e.g., from the standard workflow definitional language to the intermediate language) and for operation/use thereof (e.g., from the intermediate language to the standard workflow definitional language). In other words, the NL models of NL model(s) 222 enable the generation of workflows for automations, as described herein. These workflows are characterized, in aspects, as "programs" that describe a set of steps, actions, operations, application programming interfaces (APIs), and/or the like, to call to automate a user's workflow. Further details are described below.

Workflow logic generator 212 is configured to utilize NL model(s) 222 to generate flows, automations, bots, and/or the like, based at least on NL inputs provided by a user via a UI/GUI (e.g., as described above for FIG. 1 and in the FIGS. described below), as exemplarily described below for FIG. 3.

As noted above for FIGS. 1 and 2, aspects herein provide for generating automations via natural language processing. System 100 of FIG. 1 and/or system 200 of FIG. 2 may be configured to perform such functions and operations. It is further contemplated that the systems and components described above are configurable to be combined in any way. Further details regarding the operations and configurations of system 200, and its various sub-components, are provided in the aspects herein, including those shown in the instant FIGS., discussed in their associated descriptions.

Figure 3:
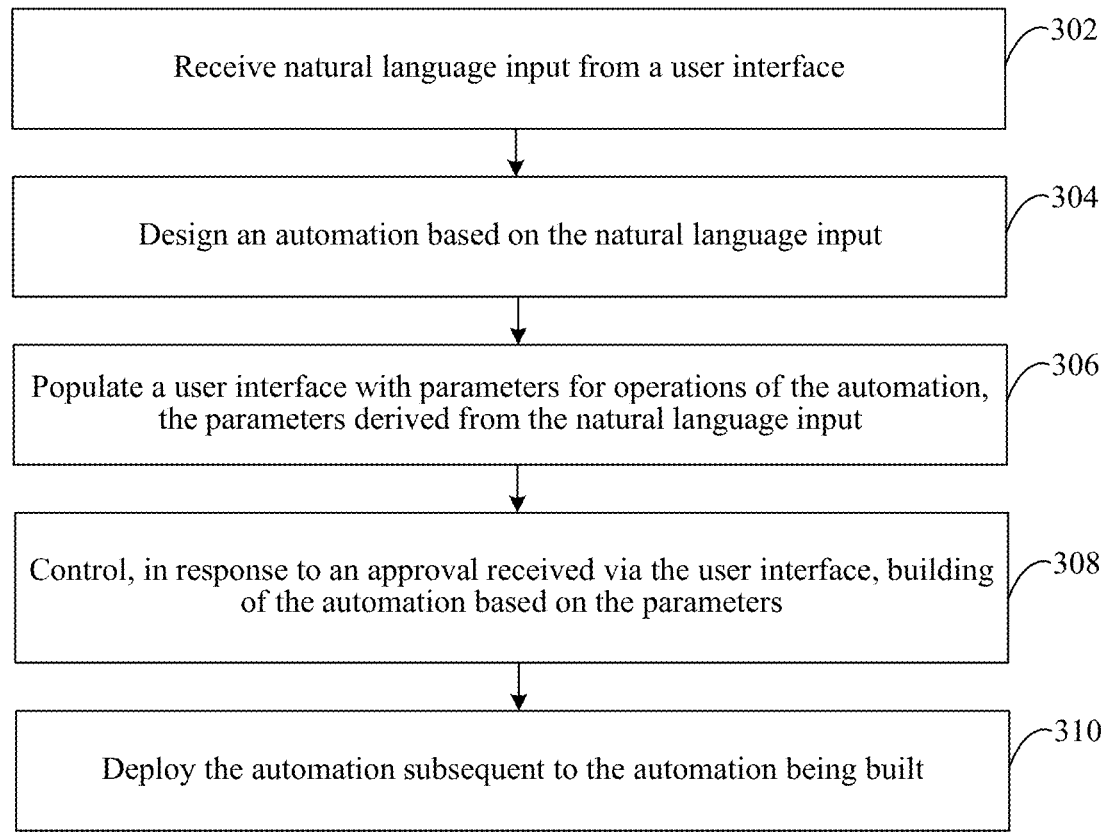
FIG. 3 shows a flowchart for generating automations via natural language processing, in accordance with an example aspect.

Referring also no to FIG. 3, in which a flowchart 300 is shown. Flowchart 300 depicts a process for generating automations via natural language processing, according to an example aspect. Further structural and operational examples will be apparent to persons skilled in the relevant art(s) based at least on the following descriptions. Flowchart 300 is described as follows with respect to system 100 of FIG. 1 and/or system 200 of FIG. 2, as described above.

Flowchart 300 begins at step 302. In step 302, natural language input is received from a user interface. For example, workflow generator 208 and/or UI generator 210 of system 200 receive NL inputs from workflow generator GUI 116 via browser 136, as similarly described above and described in further detail below.

In step 304, an automation is designed based on the natural language input. In step 304, an automation workflow may be generated based at least on the natural language input to design the automation. The automation workflow includes one or more steps to design and build an automation that includes one or more operations. Steps to design and build automations are stored in automation library 224, and are determined by workflow logic generator 212 based at least on the NL inputs (e.g., by receiving the natural language input at the machine learning NL model, which may be utilized by workflow logic generator 212, to generate an output according to the standard workflow definitional language). Accordingly, the steps to design and/or generate the automation for an appropriate workflow are determined.

In step 306, a user interface is populated with parameters for operations of the automation, the parameters derived from the natural language input. In aspects herein, a step(s) of the workflow is provided to the user interface. For instance, and as described herein, a step(s) of the workflow is/are displayed to a user via the GUIs described herein, e.g., in FIG. 5 described below. As noted herein, workflow generator 208 is configured to provide the steps to a user device, e.g., a browser or the like, for display to the user. Steps may be displayed together in a single screen, or separately in multiple screens. The steps correspond to the automation operations desired by the user, and represent the automation workflow generally. For example, and as described, some input fields for a given step are automatically populated (also "pre-populated" herein) with a parameter value(s) based on the NL input (e.g., in the example scenario "I want to store email attachments to OneDrive," the first step may have auto-populated fields for an email application "inbox"), while some other fields for the same or a different step are populated based on value "inbox," as well as here on the NL input "attachments" (e.g., "attachments" may be auto-populated, along with "attachment name" and "attachment content" parameters). In some aspects, a first field and a second field are populated in the user interface that each correspond to a step or to steps of the workflow and to operations of the automation, where the first field is populated with a first parameter value based at least on the natural language input, and the second field is populated with a second parameter value based at least on the parameter value. These parameters thus correspond to operations of the automation that is designed, as the operations are represented in the steps of the workflow shown in the GUI.

In step 308, building of the automation based on the parameters is controlled in response to an approval received via the user interface. For instance, when the workflow automation is saved, e.g., by a user via the GUI, a corresponding automation is built from design and parameters entered via the workflow population and/or the user input population. That is, the designed automations are built, e.g., as a final step, based at least on automatically populated parameters and/or final user inputs, e.g., as described below, and when saved are stored, e.g., by memory 206, as automation(s) 220, and are associated with the user via the user's accounts/identity. Ones of automation(s) 220 are stored locally to a user in embodiments, and also may be stored regionally or globally in the cloud and/or an on-premise server for deployment.

In step 310, the automation is deployed subsequent to the automation being built. In aspects, saving of the automation after building in step 308 may cause the system to deploy the automation for the user, or in some aspects, the user may manually deploy the automation via interaction with the GUI.

The example aspects provided above will be described in additional exemplary detail below with reference to FIGS. 4-9.

Figure 4:
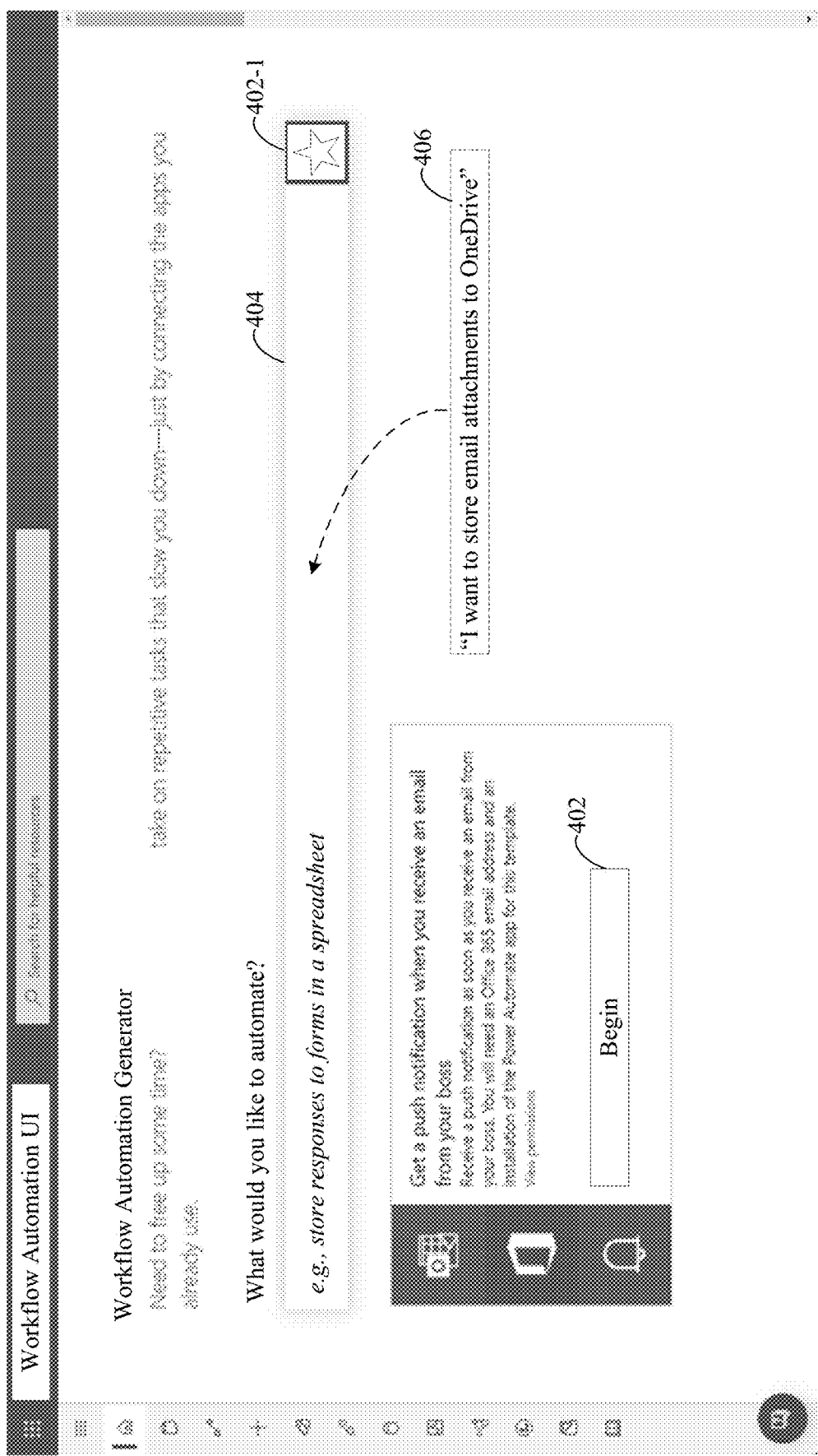
FIG. 4 shows a diagram of a user interface for generating automations via natural language processing, in accordance with an example aspect.

FIG. 4 shows a diagram of a graphical user interface (GUI) 400 for designing and generating automations via natural language processing, in an example aspect. GUI 400 may be a further aspect of those described above. GUI 400 is generated by UI generator 210 of system 200 in FIG. 2, in some aspects. GUI 400 includes, inter alia, a workflow automation begin control 402 and a natural language input field 404. In some aspects, UI generator 210 generates and provides GUI 400 based on a user selection of a NL workflow automation element of a UI presented to the user by UI generator 210 or by another webpage.

Workflow automation begin control 402 may be any type of UI control, e.g., a button, a checkbox, a link, etc., which may be activated by a user's selection thereof. Selection of workflow automation begin control 402 causes a step-by-step walkthrough for generating a suggested or recommended workflow automation, in one aspect, or causes a generic a step-by-step walkthrough for generating a workflow automation to be customized by a user. In some aspects, a separate workflow automation begin control 402-1 is included in GUI 400 to generate a workflow automation based on the user's natural language input, as described herein.

Natural language input field 404 is configured to receive natural language inputs from a user, e.g., via keyboard, voice, stylus-related actions, and/or the like, which specify, in natural language, a type of automation the user desires to generate. As shown in GUI 400, by way of illustrative example, a user input 406 of "I want to store email attachments to OneDrive" is entered in natural language input field 404.

Natural language input field 404 is pre-populated with an example suggestion for an automated workflow in some aspects, for instance, "store responses to forms in a spreadsheet," as illustrated. In some aspects, user activity with one or more services and/or applications associated with the user's account or credentials may be utilized to recommend the example suggestion in natural language input field 404, while in other aspects, popular workflow automations used by a number of other users may be suggested in natural language input field 404.

Inputs entered and/or activations made, and/or indicia thereof, for workflow automation begin control 402 and/or natural language input field 404 are provided from GUI 400 to workflow generator 208 and/or UI generator 210 of system 200 in FIG. 2, as noted in step 302 of flowchart 300 in FIG. 3, for automation design/generation via a workflow according to the inputs and/or activations, as described for step 302 and step 304.

Figure 5:
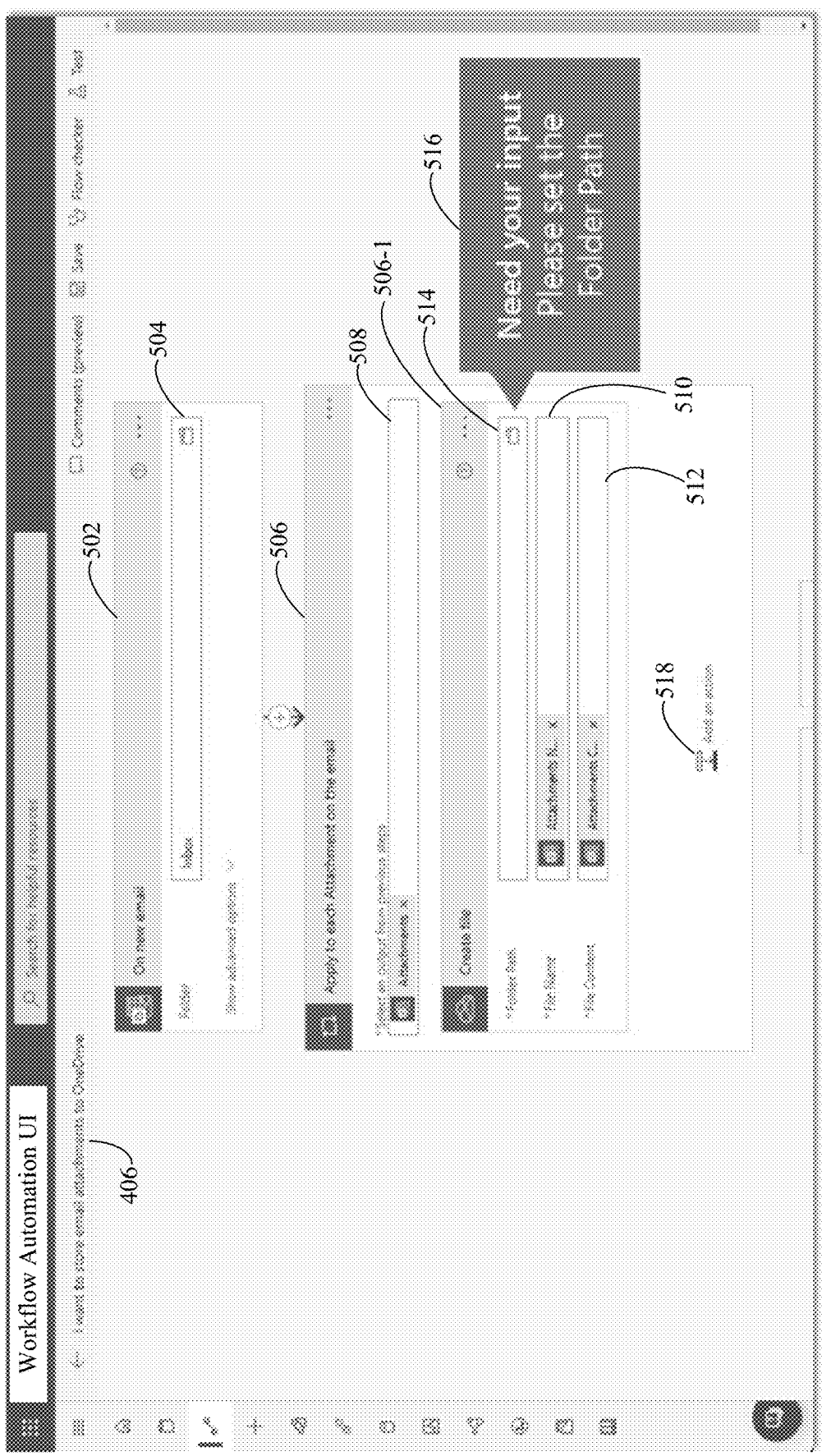
FIG. 5 shows a diagram of a user interface for generating automations via natural language processing, in accordance with an example aspect.

FIG. 5 shows a diagram of a user interface (UI) 500 for designing and generating automations via natural language processing, in an example aspect. GUI 500 may be a further aspect of those described above. GUI 500 is generated by UI generator 210 of system 200 in FIG. 2, in some aspects. GUI 500 includes, inter alia, a display of the natural language from user input 406, as well as steps (also "actions" or "operations") of the workflow automation and input fields therefor, as described below. Such steps are stored in automation library 224, in some aspects as noted herein.

For example, GUI 500 includes a workflow step display element 502 having an input field 504 associated therewith. In aspects herein, step display element 502 corresponds to user input 406 ("I want to store email attachments to OneDrive"), specifically to the "email" portion, and input field 504 is auto-/pre-populated with an identifier that is determined based at least on user input 406, and represents an operation in the designed automation. As illustratively shown by way of example, in furtherance of the scenario described above for FIG. 4 and GUI 400, user input 406 indicates that the user desires to utilize a workflow to create an automation that automatically saves attachments received by email to a user's storage account, here OneDrive® from Microsoft Corp. of Redmond, WA. Accordingly, step display element 502 is labeled as "On new email" and input field 504 is pre-populated with "Inbox," which may correspond to Outlook® from Microsoft Corp. of Redmond, WA, as the user may be authenticated currently to their Outlook® account. Additionally, user input 406 may specify "Outlook" as the email service/application in some scenarios. That is, as described above for step 306 in flowchart 300 of FIG. 3, a user interface is populated with parameters for operations of the automation, where the parameters are derived from the natural language input. In some aspects, a first field and a second field are populated in the user interface that each correspond to a workflow step(s) representing an operation of the designed automation, the first field being populated with a first parameter value based at least on the natural language input, and the second field being populated with a second parameter value based at least on the first parameter value.

As noted, in some aspects, this automatic population or pre-population is determined by applications and/or services associated with the user and their accounts, for which the user may be logged in via user credentials, or which may be identified by user credentials entered as part of the workflow automation generation process described herein. In a variation of the example above, user input 406 may be "store email attachments separately to my account," and appropriate applications and services, e.g., Outlook® and OneDrive® are determined from the user's profile and/or accounts.

In either case of providing, selecting, and/or determining applications and/or services for workflows in automation designs and/or generations, GUI 500 may include controls such as links, buttons, etc., to allow the user to manually customize the applications and/or services (e.g., the "folder" icon of input field 504, an "advanced options" control, as shown, etc.).

Also illustrated for GUI 500 is a step display element 506, which is a second workflow step(s) representing an operation of the designed automation, and which also corresponds to user input 406 ("I want to store email attachments to OneDrive"), specifically to the "attachments" and "OneDrive" portions thereof. A step display element includes one or more sub-steps and/or one or more input fields, in some aspects. Step display element 506 includes a sub-step display element 506-1 for file creation, as relates to the example for user input 406 and its "attachments" and "OneDrive" portions. This also corresponds to the operation in the designed automation to perform this function. Step display element 506 includes a number of input fields, for example, as shown: an input field 508 for selecting an output from step display element 502, an input field 510 for a file name option, and an input field 512 for a file content option. According to aspects, GUI 500 has input field 508, input field 510, and input field 512 each being automatically- or pre-populated, based on user input 406 and step display element 502, with "Attachments," Attachments Name(s)," and "Attachments Content," respectively, as similarly noted above with respect to step 308 of flowchart 300.

Also included in this example for GUI 500 is an input field 514 for a "folder path" that is not pre-populated in the instant example, although it is contemplated herein that a default folder path for the user, either specified by the user or determined by workflow generator 208 (in FIG. 2) from the user's account, services, applications, etc. An input field herein that is not pre-populated may allow a user to enter input therein, may include an activator, icon, link, button, etc., exemplarily shown in FIG. 5 as a selectable folder icon, that enables a user to navigate to folders, files, etc., and/or may include a dropdown list element with options from which the user can make a selection. Additionally, in some aspects, a user is prompted by a prompt 516 for providing input, selections, etc., for input fields, which is displayed in GUI 500.

Further user changes and customizations are also contemplated herein, as illustrated by the following non-limiting examples. For instance, step display elements may include a selectable control in their title bars or elsewhere, such as an ellipsis (' . . . '), which enables users to alter the associated steps. Similarly, a pre-populated input field includes a selectable control, e.g., an 'x', that enables the user to remove the pre-populated selection determined from a prior step, in some aspects, and to select or provide their own input as described above for input field 514. Aspects also provide for users to add additional steps beyond what is provided for user input 406 by selecting an add step element 518.

Figure 6:
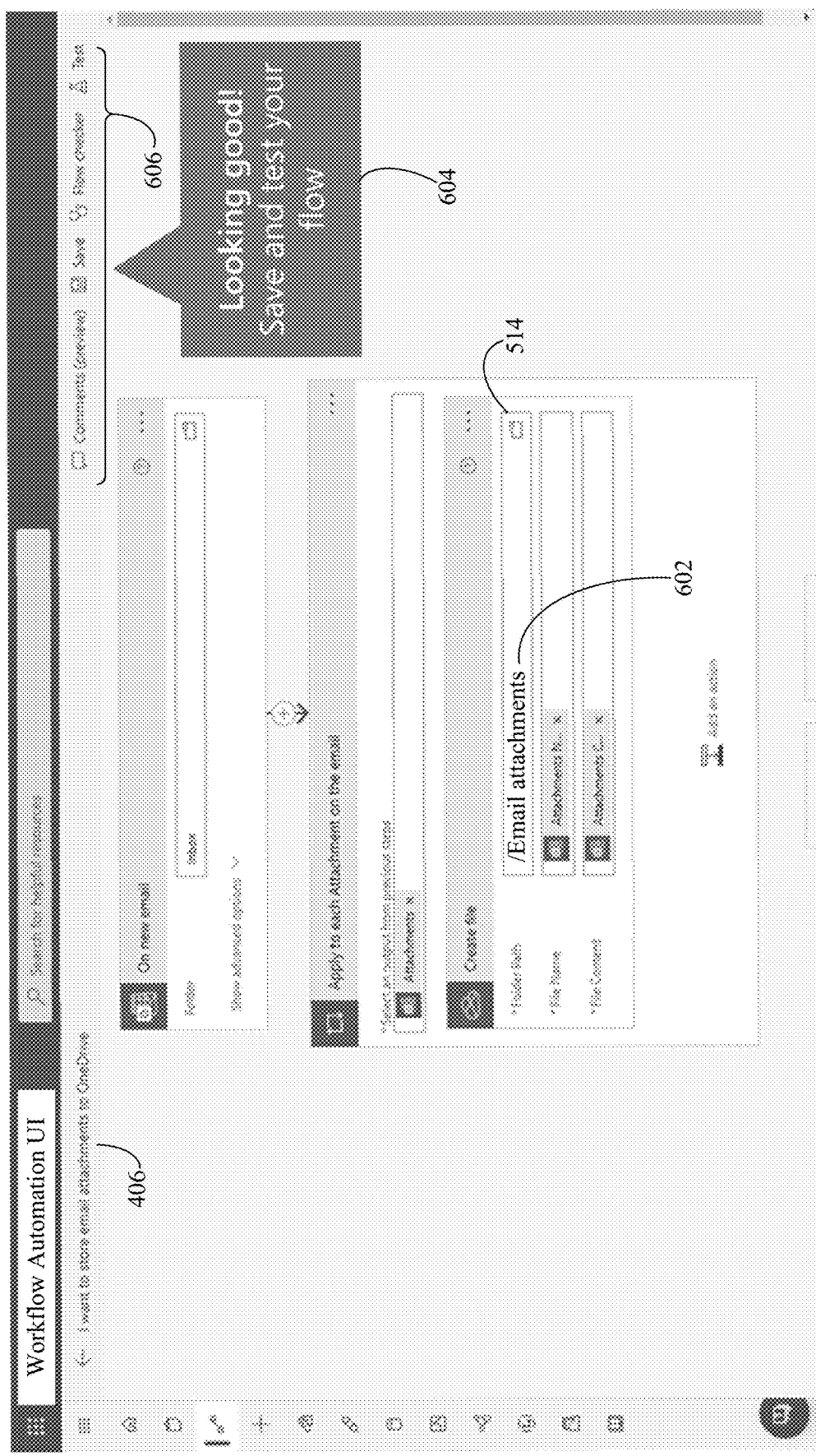
FIG. 6 shows a diagram of a user interface for generating automations via natural language processing, in accordance with an example aspect.

FIG. 6 shows a diagram of a graphical user interface (GUI) 600 for generating automations via natural language processing, in an example aspect. GUI 600 may be a further aspect of those described above. GUI 600 is generated by UI generator 210 of system 200 in FIG. 2, in some aspects. GUI 600 includes, inter alia, a display of the natural language from user input 406 and input field 514, as well as the steps (or "actions" or "operations") of the workflow automation and input fields noted above for GUI 400 and GUI 500, which are not each illustrated for clarity and brevity of description.

In the illustrated aspect, GUI 600 is shown in furtherance of a user providing input for input field 514, as described above. For example, GUI 600 includes an input 602 which designates the folder path for input field 514 as an "Email attachments" folder. In some aspects, responsive to the user entering/providing input 602 for input field 514, a prompt 604 for the user is displayed in GUI 600, which highlights attention to workflow automation options 606. Workflow automation options 606 includes, in some aspects and by way of non-limiting example, selectable options for the user to add comments to the workflow automation, to save the workflow automation, and to test and/or check the workflow automation.

When the workflow automation is saved, a corresponding automation is built, saved, and/or deployed as described above in step 308 and step 310 of flowchart 300 in FIG. 3. In embodiments, saving causes the automation to be built and/or deployed, in some aspects, and may include running the automation.

Figure 7:
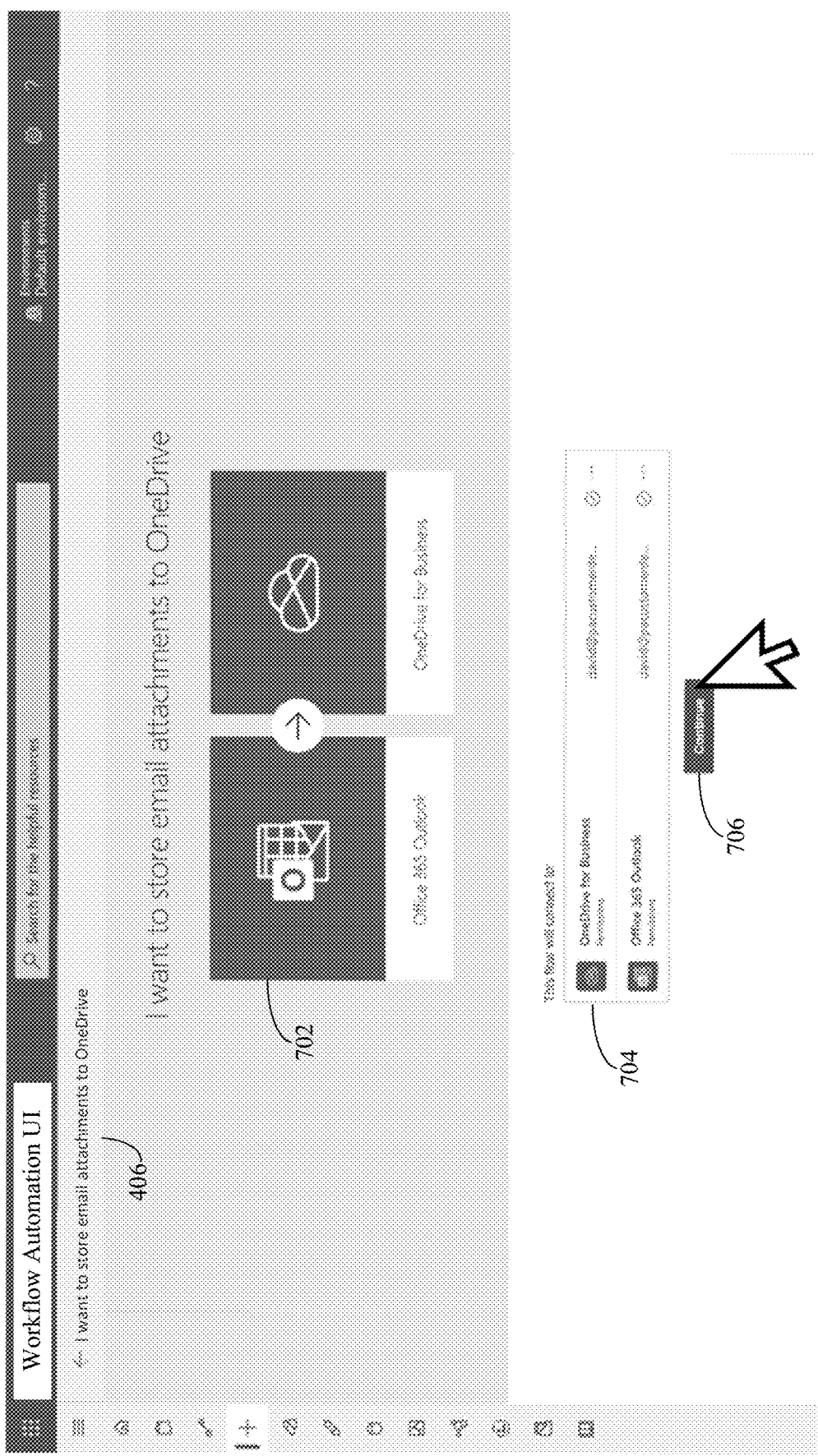
FIG. 7 shows a diagram of a user interface for generating automations via natural language processing, in accordance with an example aspect.

FIGS. 7, 8A, and 8B will now be described for additional aspects of those described above.

FIG. 7 shows a diagram of a graphical user interface (GUI) 700 for generating automations via natural language processing, in an example aspect. GUI 700 may be a further aspect of those described above. GUI 700 is generated by UI generator 210 of system 200 in FIG. 2, in some aspects. GUI 700 includes, inter alia, a display of the natural language from user input 406 and input field 514, as well as an overview 702 of the steps of the workflow from the automation exemplarily noted above.

In the illustrated aspect, GUI 700 is shown in furtherance of a user completing entry of parameters, customizations, etc., and/or saving via workflow, as described above, or a designed automation. For example, subsequent to a user entering the folder path for input 602 of input field 514 in GUI 600 of FIG. 6, described above, and/or subsequent to the user saving the automation, overview 702 of the steps of the workflow from the automation is illustrated in GUI 700 for the user. Additionally, as illustrated by way of example, an account overview 704 is illustrated, in some aspects, which allows the user to verify the account for the applications and/or services in the automation as designed and represented in the workflow steps. Additionally, the user is enabled to configure permissions, accounts, etc., via controls of account overview 704.

The user is thus enabled to select a continue control element 706 to proceed with the automation as summarized in GUI 700 for building and/or deployment.

FIG. 8A shows a diagram of a graphical user interface (GUI) 800A for generating automations via natural language processing, in an example aspect. GUI 800A is generated by UI generator 210 of system 200 in FIG. 2, in some aspects. In the illustrated aspect, GUI 800A is shown in furtherance of a user providing user input 406 in GUI 400 of FIG. 4.

GUI 800A illustrates example aspects in which a user may not be authenticated to a service or application which is to be included in the automation and workflow generation thereof, and/or aspects in which a user is enabled to select/confirm the service or application. For example, GUI 800A shows an input field 802 in which a user is prompted to enter an email account for the example user input 406 described above. Continuing with the example aspect above for user input 406, the user may enter an email address for their Outlook® account into input field 802.

FIG. 8B shows a diagram of a graphical user interface (GUI) 800B for generating automations via natural language processing, in an example aspect. GUI 800B is generated by UI generator 210 of system 200 in FIG. 2, in some aspects, and GUI 800B is in furtherance of the example aspect of GUI 800A in FIG. 8A described above.

In the illustrated aspect, subsequent to the user entering an email address for their email account into input field 802, a sign in element 804 is presented in GUI 800B that enables the user to enter their account credentials, e.g., sign in, for the email account provided for input field 802. When sign in element 804 is activated and valid credentials are entered for the user, e.g., via a sign in UI, the workflow for the automation proceeds to details and parameters for email attachments, as described herein.

In FIG. 9, a flow diagram 900 for generating automations via natural language processing is shown, according to an example aspect. Flow diagram 900 includes a training flow 902 and an inference flow 910, each for NL models as described herein.

As previously noted, the NL models of NL model(s) 222 in FIG. 2 enable the generation of workflows for designed automations, and these workflows are characterized, in aspects, as "programs" that describe a set of steps, actions, operations, application programming interfaces (APIs), and/or the like, to call to automate a user's workflow. The original workflow definition format may be, or be based on a definitional language such as, JSON in a tree-like format that is unlike any common programming languages and on which a NL model has been trained. In order to improve the performance of NL model inferences when generating workflows to design automations and to enable the workflow to determine auto-/pre-population parameters for operations of the automation, an intermediate language is provided that includes JSON format equivalents, conceptually, while also providing logical expressions that are absent from formats such as JSON. To enable such an implementation for training and performing inferences, combinations of the intermediate language and a user's NL prompt are provided as additional operations.

For example, training flow 902 includes a step 904 in which a user's NL prompt input is combined with the definitional workflow JSON. In step 906, rather than training the NL model from step 904, an intermediate language representation of the definitional workflow JSON is generated and included with the user's NL prompt input to enable logical operations in the generation of workflows to design automations based on the logical expressions in the intermediate language. For instance, as shown in the examples above, when a user's NL input includes an email program/service, e.g., Outlook®, and includes performing an action on items in the user's Inbox, the logical expressions of the intermediate language enable a determination of parameters, e.g., "Inbox," such as: IF "Outlook", THEN SELECT PARAMETER "Inbox" for received email. Similarly, in subsequent steps (e.g., step display element 506 in FIG. 5), the logical expressions of the intermediate language enable the further determination of parameters, e.g., pre-populating email attachments based on the selection of "Inbox" and the NL input of the user. Accordingly, the intermediate language representation and the NL prompt are utilized to generate, via training, an NL Model in step 908.

Likewise, inference flow 910 utilizes the intermediate language representation, in a reversed order, for generation of workflow to design automations. For instance, a user's NL input prompt is received in step 912, and is processed based on the NL model in step 914. Rather than determining the workflow directly from the output of the NL model in step 914, however, an intermediate representation at step 916 is generated from the NL model output prior to converting this representation into the workflow JSON, with the user's NL input, in step 918 for workflow generation that will design an automation, as described herein.

III. Example Mobile and Computing Device Aspects

Aspects described herein may be implemented in hardware, or hardware combined with software and/or firmware. For example, aspects described herein may be implemented as computer program code/instructions configured to be executed in one or more processors and stored in a computer readable storage medium. Alternatively, aspects described herein may be implemented as hardware logic/electrical circuitry.

As noted herein, the aspects described, including but not limited to, system 100 in FIG. 1, system 200 in FIG. 2, and the GUIs of FIGS. 4-8B, along with any components and/or subcomponents thereof, as well any data structures, and operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Aspects described herein may be implemented in one or more computing devices similar to a mobile system and/or a computing device in stationary or mobile computer aspects, including one or more features of mobile systems and/or computing devices described herein, as well as alternative features. The descriptions of computing devices provided herein are provided for purposes of illustration, and are not intended to be limiting. Aspects may be implemented in further types of computer systems, as would be known to persons skilled in the relevant art(s).

FIG. 10 shows a block diagram of an exemplary mobile device 1000 including a variety of optional hardware and software components, shown generally as components 1002. Any number and combination of the features/elements of components 1002 may be included in a mobile device aspect, as well as additional and/or alternative features/elements, as would be known to persons skilled in the relevant art(s). It is noted that any of components 1002 can communicate with any other of components 1002, although not all connections are shown, for ease of illustration. Mobile device 1000 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 1004, such as a cellular or satellite network, or with a local area or wide area network.

The illustrated mobile device 1000 can include a controller or processor referred to as processor circuit 1010 for performing such tasks as signal coding, image processing, data processing, input/output processing, power control, and/or other functions. Processor circuit 1010 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1010 may execute program code stored in a computer readable medium, such as program code of one or more applications 1014, operating system 1012, any program code stored in memory 1020, etc. Operating system 1012 can control the allocation and usage of the components 1002 and support for one or more application programs 1014 (a.k.a. applications, "apps", etc.). Application programs 1014 can include common mobile computing applications (e.g., email applications, calendars, contact managers, web browsers, messaging applications) and any other computing applications (e.g., word processing applications, mapping applications, media player applications).

As illustrated, mobile device 1000 can include memory 1020. Memory 1020 can include non-removable memory 1022 and/or removable memory 1024. The non-removable memory 1022 can include RAM, ROM, flash memory, a hard disk, or other well-known memory storage technologies. The removable memory 1024 can include flash memory or a Subscriber Identity Module (SIM) card, which is well known in GSM communication systems, or other well-known memory storage technologies, such as "smart cards." The memory 1020 can be used for storing data and/or code for running the operating system 1012 and the applications 1014. Example data can include web pages, text, images, sound files, video data, or other data sets to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing the systems described above, including the workflow development and execution systems described in reference to FIGS. 1-18B.

Mobile device 1000 can support one or more input devices 1030, such as a touch screen 1032, microphone 1034, camera 1036, physical keyboard 1038 and/or trackball 1040 and one or more output devices 1050, such as a speaker 1052 and a display 1054.

Other possible output devices (not shown) can include piezoelectric or other haptic output devices. Some devices can serve more than one input/output function. For example, touch screen 1032 and display 1054 can be combined in a single input/output device. The input devices 1030 can include a Natural User Interface (NUI).

Wireless modem(s) 1060 can be coupled to antenna(s) (not shown) and can support two-way communications between processor circuit 1010 and external devices, as is well understood in the art. The modem(s) 1060 are shown generically and can include a cellular modem 1066 for communicating with the mobile communication network 1004 and/or other radio-based modems (e.g., Bluetooth 1064 and/or Wi-Fi 1062). Cellular modem 1066 may be configured to enable phone calls (and optionally transmit data) according to any suitable communication standard or technology, such as GSM, 3G, 4G, 5G, etc. At least one of the wireless modem(s) 1060 is typically configured for communication with one or more cellular networks, such as a GSM network for data and voice communications within a single cellular network, between cellular networks, or between the mobile device and a public switched telephone network (PSTN).

Mobile device 1000 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components 1002 are not required or all-inclusive, as any components can be not present and other components can be additionally present as would be recognized by one skilled in the art.

FIG. 11 depicts an exemplary implementation of a computing device 1100 in which aspects may be implemented. For example, aspects described herein may be implemented in one or more computing devices or systems similar to computing device 1100, or multiple instances of computing device 1100, in stationary or mobile computer aspects, including one or more features of computing device 1100 and/or alternative features. The description of computing device 1100 provided herein is provided for purposes of illustration, and is not intended to be limiting. Aspects may be implemented in further types of computer systems, servers, and/or clusters, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1130, one or more application programs 1132, other programs 1134, and program data 1136. Application programs 1132 or other programs 1134 may include, for example, computer program logic (e.g., computer program code or instructions) for implementing aspects described herein, such as but not limited to, system 100 in FIG. 1, system 200 in FIG. 2, and the GUIs of FIGS. 4-8B, along with any components and/or subcomponents thereof, as well any data structures, and operations of the flowcharts/flow diagrams described herein, including portions thereof, and/or further examples described herein.

A user may enter commands and information into the computing device 1100 through input devices such as keyboard 1138 and pointing device 1140. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to, or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

A TPM may be connected to bus 1106, and may be an aspect of any TPM, as would be understood by one of skill in the relevant art(s) having the benefit of this disclosure. For example, the TPM may be configured to perform one or more functions or operations of TPMs for various aspects herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Aspects are also directed to such communication media that are separate and non-overlapping with aspects directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of aspects discussed herein. Accordingly, such computer programs represent controllers of the computing device 1100.

Aspects are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for generating automations via natural language processing. In aspects, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the aspects that are configured to perform functions and/or operations are also contemplated as performing such functions and/or operations.

Any additional examples and aspects described in this Section may be applicable to examples disclosed in any other Section or subsection of this disclosure.

Aspects provided in this description provide for systems, devices, and methods for generating automations via natural language processing. For instance, such a system is described herein. The system includes a program memory that stores program code, and a processing system, based on the program code, to perform one or more operations. The one or more operations include to: receive natural language input from a user interface; design an automation based on the natural language input; populate a user interface with parameters for operations of the automation, the parameters derived from the natural language input; and control, in response to an approval received via the user interface, building of the automation based on the parameters.

In an aspect of the system, the processing system is to: subsequent to the user interface being populated with the parameters: provide a prompt corresponding to a blank field of the user interface for user input thereto, and receive the user input via the user interface; and the building of the automation is also based on the user input.

In an aspect of the system, the automation is designed also based on a machine learning model that is trained using natural language prompts and a second workflow definitional language that is derived from a first workflow definitional language, the second workflow definitional language including logical expressions that are absent from the first workflow definitional language; and the processing system is to: receive the natural language input at the machine learning model to generate an output according to second workflow definitional language, and convert the output into the first workflow definitional language to design the automation.

In an aspect of the system, the second automation workflow definitional language includes logical expressions that are absent from the second automation workflow definitional language; and the second automation workflow definitional language enables step iterations that are absent from the first automation workflow definitional language.

In an aspect of the system, the processing system is to: populate a first field in the user interface with a first parameter derived from the natural language input; and populate a second field in the user interface with a second parameter that is also derived from the first parameter.

In an aspect of the system, the user interface accepts a modification by a user to alter the first parameter or the second parameter, or the second parameter is also derived at least from account information associated with the user.

In an aspect of the system, the operations are determined based on a library associated with an application or a service associated with the application, or the operations are for one of: a combination of web-based applications; a combination of web-based services; and a combination of web based applications and web based services.

In an aspect of the system, the processing system is to: deploy the automation subsequent to the automation being built.

A method performed by a computing system is also described herein. The method includes receiving natural language input from a user interface; designing an automation based on the natural language input; populating a user interface with parameters for operations of the automation, the parameters derived from the natural language input; and controlling, in response to an approval received via the user interface, building of the automation based on the parameters.

In an aspect, the method includes, subsequent to the user interface being populated with the parameters: providing a prompt corresponding to a blank field of the user interface for user input thereto, and receiving the user input via the user interface; and the building of the automation is also based on the user input.

In an aspect of the method, at least one of the one or more operations based at least on a machine learning model that is trained utilizing at least natural language prompts and a second automation workflow definitional language that derived from a first automation workflow definitional language.

In an aspect of the method, the automation is designed also based on a machine learning model that is trained using natural language prompts and a second workflow definitional language that is derived from a first workflow definitional language, the second workflow definitional language including logical expressions that are absent from the first workflow definitional language; and the method includes: receiving the natural language input at the machine learning model to generate an output according to second workflow definitional language, and converting the output into the first workflow definitional language to design the automation.

In an aspect of the method, the second automation workflow definitional language includes logical expressions that are absent from the second automation workflow definitional language; and the second automation workflow definitional language enables step iterations that are absent from the first automation workflow definitional language.

In an aspect, the method includes populating a first field in the user interface with a first parameter derived from the natural language input, and populating a second field in the user interface with a second parameter that is also derived from the first parameter.

In an aspect of the method, the user interface accepts a modification by a user to alter the first parameter or the second parameter; or the second parameter is also derived at least from account information associated with the user.

In an aspect of the method, the operations are determined based on a library associated with an application or a service associated with the application; or the operations are for one of: a combination of web-based applications; a combination of web-based services; and a combination of web based applications and web based services A computer-readable storage medium having program instructions recorded thereon that, when executed by a processing system, perform a method, is also described. The method includes receiving natural language input from a user interface; designing an automation based on the natural language input; populating a user interface with parameters for operations of the automation, the parameters derived from the natural language input, including: populating a first field in the user interface with a first parameter derived from the natural language input, and populating a second field in the user interface with a second parameter that is also derived from the first parameter; and controlling, in response to an approval received via the user interface, building of the automation based on the parameters.

In an aspect of the computer-readable storage medium, the method further includes, subsequent to the user interface being populated with the parameters: providing a prompt corresponding to a blank field of the user interface for user input thereto, and receiving the user input via the user interface; and the building of the automation is also based on the user input.

In an aspect of the computer-readable storage medium, at least one of the one or more operations based at least on a machine learning model that is trained utilizing at least natural language prompts and a second automation workflow definitional language that derived from a first automation workflow definitional language.

In an aspect of the computer-readable storage medium, the automation is designed also based on a machine learning model that is trained using natural language prompts and a second workflow definitional language that is derived from a first workflow definitional language, the second workflow definitional language including logical expressions that are absent from the first workflow definitional language; and the method includes: receiving the natural language input at the machine learning model to generate an output according to second workflow definitional language, and converting the output into the first workflow definitional language to design the automation.

In an aspect of the computer-readable storage medium, the second automation workflow definitional language includes logical expressions that are absent from the second automation workflow definitional language, and the second automation workflow definitional language enables step iterations that are absent from the first automation workflow definitional language.

In an aspect of the computer-readable storage medium, the user interface accepts a modification by a user to alter the first parameter or the second parameter; and the building of the automation based on the parameters includes building the automation utilizing the modification.

V. Conclusion

While various aspects of the disclosed subject matter have been described above, it should be understood that they have been presented by way of example only, and not limitation. It will be understood by those skilled in the relevant art(s) that various changes in form and details may be made therein without departing from the spirit and scope of the aspects as defined in the appended claims. Accordingly, the breadth and scope of the disclosed subject matter should not be limited by any of the above-described exemplary aspects, but should be defined only in accordance with the following claims and their equivalents.

What is claimed is:

1. A system comprising:
a program memory that stores program code; and
a processing system, based on the program code to:
receive, at a machine learning model trained using natural language prompts and a second workflow definitional language that is derived from a first workflow definitional language, a natural language input from a first user interface;
output, by the machine learning model based on the natural language input, an output according to the second workflow definitional language;
convert the output into the first workflow definitional language to design an automation;
populate a graphical user interface with parameters for operations of the automation, the parameters derived from the natural language input; and
control, in response to an approval received via the graphical user interface, building of the automation based on the parameters.

2. The system of claim 1, wherein the processing system, in response to receiving the program code, is to:
subsequent to the graphical user interface being populated with the parameters:
provide a prompt corresponding to a blank field of the graphical user interface for user input thereto; and
receive the user input via the graphical user interface; and
wherein the building of the automation is also based on the user input.

3. The system of claim 1, wherein the second workflow definitional language includes logical expressions that are absent from the first workflow definitional language.

4. The system of claim 3, wherein
the second automation workflow definitional language enables workflow step iterations for designing automations that are absent from the first automation workflow definitional language.

5. The system of claim 1, wherein the program code causes the processing system to:
populate a first field in the graphical user interface with a first parameter derived from the natural language input; and
populate a second field in the graphical user interface with a second parameter that is also derived from the first parameter.

6. The system of claim 5, wherein the graphical user interface accepts a modification by a user to alter the first parameter or the second parameter; or
wherein the second parameter is also derived at least from account information associated with the user.

7. The system of claim 1, wherein the operations are determined based on a library associated with an application or a service associated with the application; or
wherein the operations are for one of: a combination of web-based applications; a combination of web-based services; and a combination of web based applications and web based services.

8. The system of claim 1, wherein the processing system is to:
deploy the automation subsequent to the automation being built.

9. A method performed by a computing system, the method comprising:
receiving, at a machine learning model trained using natural language prompts and a second workflow definitional language that is derived from a first workflow definitional language, a natural language input from a first user interface;
outputting, by the machine learning model based on the natural language input, an output according to the second workflow definitional language;
converting the output into the first workflow definitional language to design an automation;
populating a graphical user interface with parameters for operations of the automation, the parameters derived from the natural language input; and
controlling, in response to an approval received via the graphical user interface, building of the automation based on the parameters.

10. The method of claim 9, further comprising:
subsequent to the graphical user interface being populated with the parameters:
providing a prompt corresponding to a blank field of the graphical user interface for user input thereto; and
receiving the user input via the graphical user interface; and
wherein the building of the automation is also based on the user input.

11. The method of claim 9, wherein the second workflow definitional language including logical expressions that are absent from the first workflow definitional language.

12. The method of claim 11, wherein
the second automation workflow definitional language enables workflow step iterations for designing automations that are absent from the first automation workflow definitional language.

13. The method of claim 9, further comprising:
populating a first field in the graphical user interface with a first parameter derived from the natural language input; and
populating a second field in the graphical user interface with a second parameter that is also derived from the first parameter.

14. The method of claim 13, wherein the graphical user interface accepts a modification by a user to alter the first parameter or the second parameter; or
wherein the second parameter is also derived at least from account information associated with the user.

15. The method of claim 9, wherein the operations are determined based on a library associated with an application or a service associated with the application; or
wherein the operations are for one of: a combination of web-based applications; a combination of web-based services; and a combination of web based applications and web based services.

16. A computer-readable storage medium having program instructions recorded thereon that, when executed by a processing system, perform a method, the method comprising:
receiving, at a machine learning model trained using natural language prompts and a second workflow definitional language that is derived from a first workflow definitional language, a natural language input from a first user interface;
outputting, by the machine learning model based on the natural language input, an output according to the second workflow definitional language;
converting the output into the first workflow definitional language to design an automation;
populating a graphical user interface with parameters for operations of the automation, the parameters derived from the natural language input, including:
populating a first field in the graphical user interface with a first parameter derived from the natural language input; and
populating a second field in the graphical user interface with a second parameter that is also derived from the first parameter; and
controlling, in response to an approval received via the graphical user interface, building of the automation based on the parameters.

17. The computer-readable storage medium of claim 16, wherein the method further comprises:
subsequent to the graphical user interface being populated with the parameters:
providing a prompt corresponding to a blank field of the graphical user interface for user input thereto; and
receiving the user input via the graphical user interface; and
wherein the building of the automation is also based on the user input.

18. The computer-readable storage medium of claim 16, wherein the second workflow definitional language including logical expressions that are absent from the first workflow definitional language.

19. The computer-readable storage medium of claim 18, wherein
the second automation workflow definitional language enables workflow step iterations for designing automations that are absent from the first automation workflow definitional language.

20. The computer-readable storage medium of claim 16, wherein the graphical user interface accepts a modification by a user to alter the first parameter or the second parameter; and
wherein the building of the automation based on the parameters includes building the automation utilizing the modification.

* * * * *